J. A. HOUSE.
CUSPIDOR CASTER.
APPLICATION FILED AUG. 30, 1919.

1,330,376.

Patented Feb. 10, 1920.

WITNESSES
E. A. Buchanan.
C. E. Trainor.

INVENTOR
J. A. House.
BY
ATTORNEYS

UNITED STATES PATENT OFFICE.

JAMES A. HOUSE, OF DYER, TENNESSEE.

CUSPIDOR-CASTER.

1,330,376.  Specification of Letters Patent.  Patented Feb. 10, 1920.

Application filed August 30, 1919. Serial No. 320,960.

*To all whom it may concern:*

Be it known that I, JAMES A. HOUSE, a citizen of the United States, and a resident of Dyer, in the county of Gibson and State of Tennessee, have invented certain new and useful Improvements in Cuspidor-Casters, of which the following is a specification.

My invention is an improvement in cuspidor casters and has for its object to provide a device of the character specified supported by caster wheels in such manner that it will move freely in any direction and having means for attaching it to a cuspidor of any size for firmly clamping the cuspidor to the caster.

Figure 1:
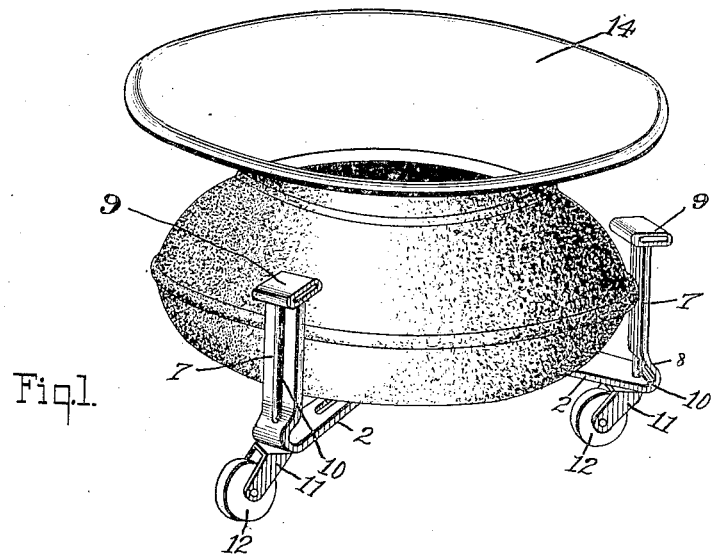
Figure 1 is a perspective view of the support, with the cuspidor in place.
Figure 2:
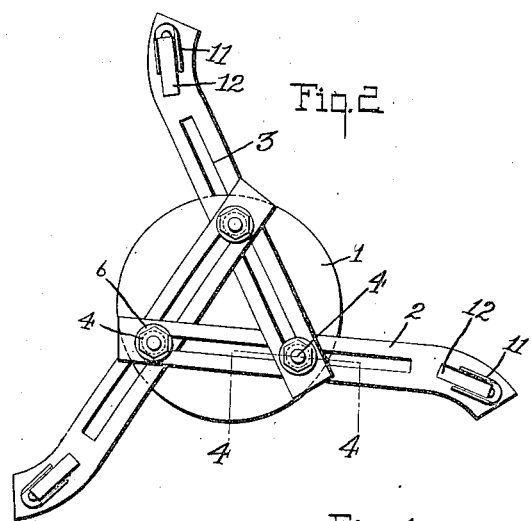
Fig. 2 is a bottom plan view of the support.

In the present embodiment of the invention a support is provided, consisting of a disk or plate 1 and a series of arms 2 detachably and adjustably connected with the plate, and a caster wheel is supported by each arm. Each of these arms, as shown, has a longitudinally extending slot 3, and the slots are engaged by screw bolts 4 which are passed through the plate 1 from above upward and are engaged by nuts 5 below the arms. Each of the screw bolts passes through the slots of two arms and the arms are arranged on the plate in triangular form, as shown, so that they extend at angles of one hundred twenty degrees with respect to each other.

Figure 3:
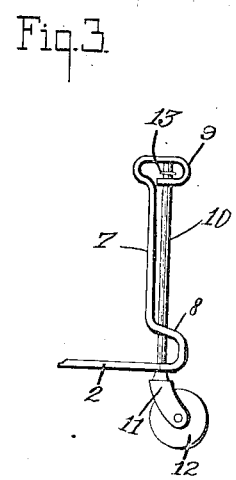
Fig. 3 is a partial side view of one of the legs, showing the mounting of the caster wheels.
Figure 4:
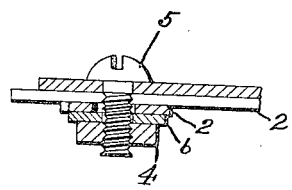
Fig. 4 is a detail view.

A washer 6 is arranged between each nut and the adjacent arms 2 and each arm is provided at its outer end with an upwardly bent extension 7 for a purpose to be presently described, Each of these extensions, as shown in Fig. 3, is offset inwardly just above the arm to form a portion 8 which lies approximately parallel with the arm in spaced relation, and at its upper extremity each extension is bent to form a loop 9, and each of these loops, as shown, consists of vertically spaced portions which are approximately parallel with the body of the arm 2 and the lowermost of these portions, that is, the lowermost side of the loop and the portion 8 as well as the arm 2 have alining perforations.

A staff or journal pin 10 is held in the openings of the loop and of the portion 8 of the extension, each pin carrying at its lower end a yoke 11, between whose arms is journaled a wheel 12. Each pin has a stop 13 between the arms of the loop 9 for limiting its downward movement and each of the said pins is free to rotate on a vertical axis in the loop, the portion 8 and the arm 2. Thus the support is mounted on caster wheels which may swing freely in any direction, and the upper end of the staff or pin 10 bearing against the top of the loop is limited in its upward movement by such engagement.

The cuspidor, indicated at 14, is seated on the plate or disk 1 and the arms are so adjusted with respect to the disk by loosening the nuts 4 that the body of the cuspidor is clamped between the extensions 7 of the arm. When so held there is no possibility of the cuspidor becoming accidentally disengaged, and in case the cuspidor is struck accidentally, as, for instance, by a kick, instead of overturning it will merely roll out of the way. Since it is supported by caster wheels it will roll freely in any direction and there will be no possibility of overturning.

When it is desired to clean the cuspidor it may be removed from the support.

I claim:

A cuspidor support comprising a disk, arms having longitudinally extending slots, and a bolt for each arm for connecting the arm to the disk, the disk having openings corresponding in number to the arms and each bolt passing through an opening and passing through the slots of two arms to adjustably connect the arms to the disk and to each other, each arm having an upstanding member for engaging the cuspidor and a depending wheel.

JAMES A. HOUSE.